US011477455B2

(12) United States Patent
Shingala et al.

(10) Patent No.: US 11,477,455 B2
(45) Date of Patent: Oct. 18, 2022

(54) IN-LOOP RESHAPING WITH LOCAL ILLUMINATION COMPENSATION IN IMAGE CODING

(71) Applicant: Dolby Laboratories Licensing Corporation, San Francisco, CA (US)

(72) Inventors: Jay Nitin Shingala, Bangalore (IN); Ashwin Natesan, Bangalore (IN); Peng Yin, Ithaca, NY (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 17/400,284

(22) Filed: Aug. 12, 2021

(65) Prior Publication Data

US 2021/0377539 A1    Dec. 2, 2021

Related U.S. Application Data

(63) Continuation of application No. 16/892,976, filed on Jun. 4, 2020, now Pat. No. 11,122,270.

(60) Provisional application No. 62/877,518, filed on Jul. 23, 2019.

(30) Foreign Application Priority Data

Jun. 5, 2019    (IN) .............................. 201941022342

(51) Int. Cl.
| H04N 19/132 | (2014.01) |
| H04N 19/105 | (2014.01) |
| H04N 19/176 | (2014.01) |
| H04N 19/186 | (2014.01) |
| H04N 19/159 | (2014.01) |

(52) U.S. Cl.
CPC ......... *H04N 19/132* (2014.11); *H04N 19/105* (2014.11); *H04N 19/159* (2014.11); *H04N 19/176* (2014.11); *H04N 19/186* (2014.11)

(58) Field of Classification Search
CPC .. H04N 19/132; H04N 19/105; H04N 19/159; H04N 19/176; H04N 19/186; H04N 19/117
USPC ........................................................ 375/240
See application file for complete search history.

(56) References Cited

U.S. PATENT DOCUMENTS

| 2018/0124399 A1 | 5/2018 | Su |
| 2018/0309995 A1 | 10/2018 | He |
| 2019/0068969 A1 | 2/2019 | Rusanovskyy |
| 2020/0252653 A1 | 8/2020 | Rusanovskyy |

OTHER PUBLICATIONS

"Algorithm description for Joint Exploration Test Model 7 (JEM 7)," J. Chen et al., JVET Output document, JVET-G1001-v1, 7th Meeting, Torino, IT, Jul. 13-21, 2017.

"Algorithm description for Versatile Video Coding and Test Model 4 (VTM 4)," J. Chen et al., JVET Output document, JVET-M1002-V2, 13th Meeting, Marrakech, Jan. 9-18, 2019.

(Continued)

*Primary Examiner* — Susan E. Torgerson

(57) ABSTRACT

Methods, processes, and systems are presented for combining signal reshaping (also referred to as luma mapping chroma residuals scaling) with local illumination compensation (LIC) in video coding. Examples and trade-offs when the LIC model parameters are computed in the original domain, the reshaped domain, or a mixed domain, are presented.

7 Claims, 5 Drawing Sheets

(56) References Cited

OTHER PUBLICATIONS

Bross, J. et al. "Versatile Video Coding (Draft 5)", JVET output document, JVET-N1001, V5, May 14, 2019.
ITU-R BT.2020 "Parameter Values for Ultra-High Definition Television Systems for Production and International Programme Exchange" Aug. 2012.
ITU-R BT.709-6 "Parameter Values for the HDTV Standards for Production and International Programme Exchange" Jun. 2015.
SMPTE Standard "High Dynamic Range Electro-Optical Transfer Function of Mastering Reference Displays" SMPTE ST 2084:2014.

IN-LOOP RESHAPING WITH LOCAL ILLUMINATION COMPENSATION IN IMAGE CODING

CROSS-REFERENCE TO RELATED APPLICATIONS

This application is a continuation of U.S. patent application Ser. No. 16/892,976, filed on Jun. 4, 2020, which claims priority to U.S. Provisional Application No. 62/877,518, filed on Jul. 23, 2019, and Indian Patent Application No. 201941022342, filed on Jun. 5, 2019, each of which is incorporated by reference in its entirety.

TECHNOLOGY

The present document relates generally to images and video coding. More particularly, an embodiment of the present invention relates to image reshaping combined with local illumination compensation in video coding.

BACKGROUND

In 2013, the MPEG group in the International Standardization Organization (ISO), jointly with the International Telecommunications Union (ITU), released the first draft of the HEVC (also known as H.265) video coding standard. More recently, the same group has been working on the development of the next generation coding standard (referred to as Versatile Video Coding or VVC standard (Ref. [1])) that provides improved coding performance over existing video coding technologies.

As used herein, the term 'bit depth' denotes the number of pixels used to represent one of the color components of an image. Traditionally, images were coded at 8-bits, per color component, per pixel (e.g., 24 bits per pixel); however, modern architectures may now support higher bit depths, such as 10 bits, 12 bits or more.

In a traditional image pipeline, captured images are quantized using a non-linear opto-electronic function (OETF), which converts linear scene light into a non-linear video signal (e.g., gamma-coded RGB or YCbCr). Then, on the receiver, before being displayed on the display, the signal is processed by an electro-optical transfer function (EOTF) which translates video signal values to output screen color values. Such non-linear functions include the traditional "gamma" curve, documented in ITU-R Rec. BT.709 and BT. 2020, the "PQ" (perceptual quantization) curve described in SMPTE ST 2084, and the "HybridLog-gamma" or "HLG" curve described in and Rec. ITU-R BT. 2100.

As used herein, the term "forward reshaping" denotes a process of sample-to-sample or codeword-to-codeword mapping of a digital image from its original bit depth and original codewords distribution or representation (e.g., gamma or PQ or HLG, and the like) to an image of the same or different bit depth and a different codewords distribution or representation. Reshaping allows for improved compressibility or improved image quality at a fixed bit rate. For example, without limitation, reshaping may be applied to 10-bit or 12-bit PQ-coded HDR video to improve coding efficiency in a 10-bit video coding architecture. In a receiver, after decompressing the reshaped signal, the receiver may apply an "inverse reshaping function" to restore the signal to its original codeword distribution. As appreciated by the inventors here, as development continues for the next generation of a video coding standard, improved techniques for the integrated reshaping and coding of images are desired. Methods of this invention can be applicable to a variety of video content, including, but not limited, to content in standard dynamic range (SDR) and/or high-dynamic range (HDR).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
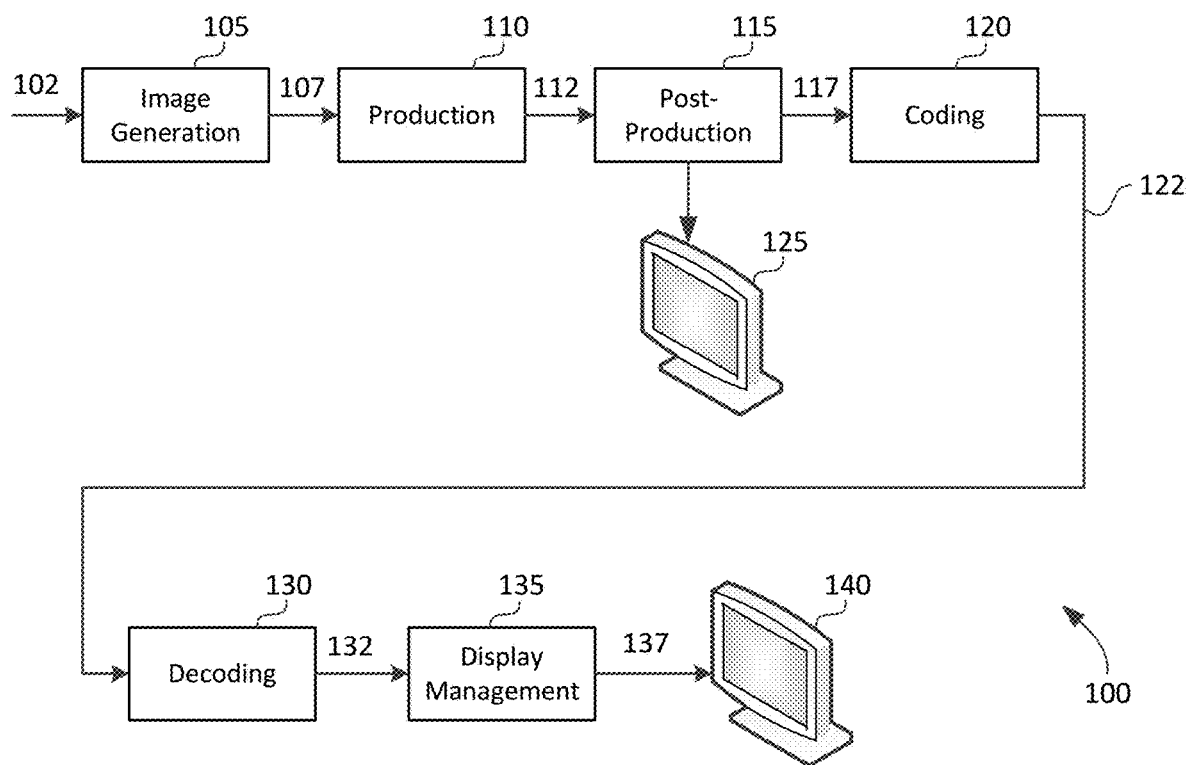
FIG. 1 depicts an example process for a video delivery pipeline according to prior art.

Techniques for combining reshaping functions with local illumination compensation in video coding are described herein. In the following description, for the purposes of explanation, numerous specific details are set forth in order to provide a thorough understanding of the various embodiments of the present invention. It will be apparent, however, that the various embodiments of the present invention may be practiced without these specific details. In other instances, to avoid redundancies and improve readability, well-known structures and devices are not described in exhaustive detail.

SUMMARY

Example embodiments described herein relate to combining signal reshaping with local illumination compensation in video coding. In a decoder, a processor receives first neighboring samples of a current coded unit (CU) (302) in a reshaped domain;

accesses neighboring samples of a reference block to the current CU (304) in an original domain;

generates (315) second neighboring samples of the current CU in the original domain by applying an inverse mapping function to the first neighboring samples of the current CU;

generates (305) LIC parameters based on the second neighboring samples of the current CU and the neighboring samples of the reference block to the current CU;

accesses first inter-predicted samples for the current CU (308) in the original domain;

generates (310) second inter-predicted samples for the current CU based on the LIC parameters, a linear mapping using the LIC parameters, and the first inter-predicted samples for the current CU; and generates (282) output inter-predicted samples for the current CU in the reshaped domain by applying a forward mapping function to the second inter-predicted samples for the current CU.

In a second embodiment, in a decoder, a processor accesses neighboring samples of a current coded unit (CU) (302) in a reshaped domain;

accesses first neighboring samples of a reference block to the current CU (304) in an original domain;

generates (320) second neighboring samples of the reference block to the current CU in the reshaped domain by applying a forward mapping function to the second neighboring samples of the reference block to the current CU;

generates (305) LIC parameters based on the neighboring samples of the current CU and the second neighboring samples of the reference block to the current CU;

accesses first inter-predicted samples for the current CU (308) in the original domain;

generates (282) second inter-predicted samples for the current CU in the reshaped domain by applying the forward mapping function to the first inter-predicted samples for the current CU; and generates (310) output inter-predicted samples for the current CU in the reshaped domain based on the LIC parameters, a linear mapping using the LIC parameters, and the second inter-predicted samples for the current CU.

In a third embodiment, in a decoder, a processor accesses first neighboring samples of a current coded unit (CU) (302) in a reshaped domain;

accesses first neighboring samples of a reference block to the current CU (304) in an original domain;

generates (320) second neighboring samples of the reference block to the current CU in the reshaped domain by applying a forward mapping function to the second neighboring samples of the reference block to the current CU;

generates (305) LIC parameters based on the first neighboring samples of the current CU and the second neighboring samples of the reference block to the current CU;

accesses first inter-predicted samples for the current CU (308) in the original domain;

generates (310) second inter-predicted samples for the current CU in the original domain based on the LIC parameters, a linear mapping using the LIC parameters, and the first inter-predicted samples for the current CU; and generates (282) output inter-predicted samples for the current CU in the reshaped domain by applying the forward mapping function to the second inter-predicted samples for the current CU.

Example Video Delivery Processing Pipeline

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Signal Reshaping

Figure 2A:
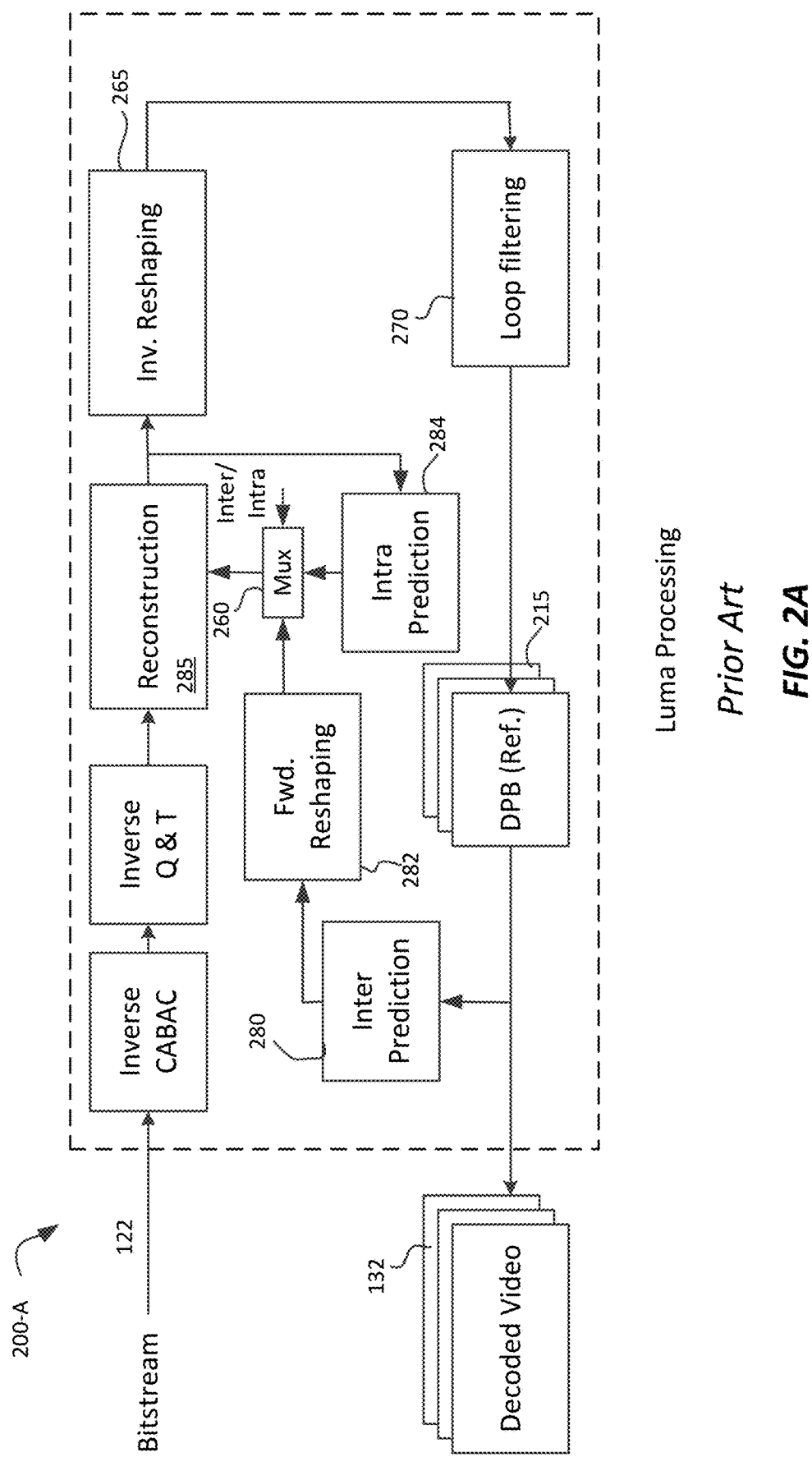
FIG. 2A depicts an example architecture for in-loop decoding of luma data according to prior art.
Figure 2B:
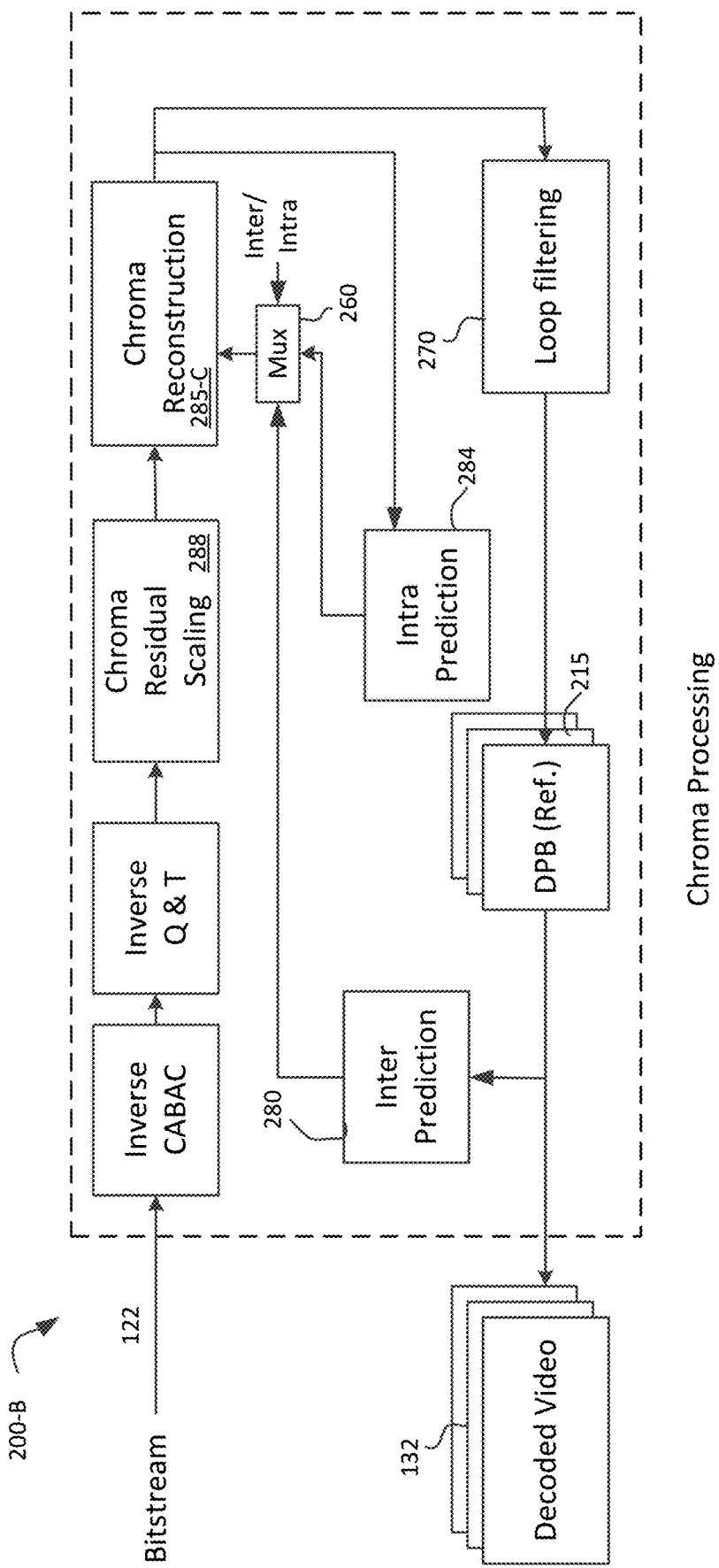
FIG. 2B depicts an example architecture for in-loop decoding of chroma data according to prior art.

As used herein, the term "reshaper" may denote a forward or an inverse reshaping (or mapping) function to be used when coding and/or decoding digital images. FIG. 2A and FIG. 2B depict example decoding processes for in-loop signal reshaping according to Refs. [1-3]. In VVC, reshaping is referred to as LMCS—Luma Mapping with Chroma residue Scaling. Process 200-A is related to luma processing and process 200-B is related to chroma processing.

For luma, given a coded bitstream (122), after inverse arithmetic coding (e.g. inverse CABAC) and inverse quantization and transform (Inverse Q &T), in the reconstruction module (285), given the output $Y_{res}$ of Inverse Q &T, for Inter-coded units (CUs) (e.g., the Mux (260) enables the output from 280 and 282), its output $Y_r$ is computed as:

$$Y_r = (Y_{res} + \text{FWdMap}(Y_{pred})), \quad (1)$$

where $\text{FwdMap}(Y_{pred})$ denotes the output (e.g., $Y_{pred}$) of the inter predictor (280) followed by forward reshaping (282) using forward reshaping function FwdMap( ) Otherwise, for Intra CUs (e.g., the Mux (260) enables the output from intra prediction unit 284), the output of the reconstruction module (285) is $$Y_r = (Y_{res} + \text{IPredSample}), \quad (2)$$

where IPredSample denotes the output of the Intra Prediction block (284). Given an inverse reshaping function InvMap( ) the inverse Reshaping block (265), generates $$Y_{ir} = \text{InvMap}(Y_r). \quad (3)$$

Inverse reshaping (265) is followed by traditional loop filtering (270) in the original domain, and the output of loop filtering is stored in the display-picture-buffer (DPB) (215) to be used as reference pictures for inter prediction (280) or to generate the decoded video (132).

For chroma, when in-loop reshaping is enabled, as depicted in FIG. 2B, the following changes are made:

The forward and reverse reshaping blocks (282 and 265) blocks are not used

There is a new chroma residual scaling block (288); and

The reconstruction block (285-C) is modified to handle color residuals as $$CxRec = CxPred + CxRes, \qquad (4)$$

where CxRes denotes the output of chroma residual scaling block (288), CxPred denotes the output of predicted chroma samples, generated either by the Intra (284) or Inter (280) Prediction blocks, and CxRec denotes the output.

Let CxResScaled denote the extracted scaled chroma residual signal after inverse quantization and transform (before block 288), and let $$CxRes = CxResScaled * C_{ScaleInv}, \qquad (5)$$

denote the rescaled chroma residual generated by the Chroma Residual scaling block (288) to be used by the reconstruction unit (285-C) to compute its output according to equation (4).

The $C_{ScaleInv}$ value being used for a Transform Unit (TU) may be shared by the Cb and Cr components, it is luma dependent, and can be computed as follows:

If in intra mode, then compute the average of intra predicted luma values;

if in inter mode, then compute the average of forward reshaped inter-predicted luma values. That is, the average luma value $avgY'_{TU}$ is computed in the reshaped domain; and If in combined merge and intra prediction, then compute the average of combined predicted luma values. For example, the combined predicted luma values may be computed according to Ref. [1].

In an embodiment, one can apply a LUT to compute C ScaleInv based on $avgY'_{TU}$. Alternatively, given a piece-wise-linear (PWL) representation of the reshaping function one may find the index idx where the value $avgY'_{TU}$ belongs to in the inverse-mapping PWL. Then, $C_{ScaleInv} = c_{ScaleInv}[idx]$ An example implementation, as it is applicable to the Versatile Video Coding codec can be found in Ref. [1].

Local Illumination Compensation

Local Illumination Compensation (LIC) is an inter-prediction tool that models illumination changes using two scaling factors, a and b (Ref[4]). When LIC is applied for a coding unit (CU), a least square error method is employed to derive the parameters "a" and "b" by using the neighboring samples of the current CU and corresponding neighboring sample of a reference prediction unit. LIC may be enabled and/or disabled adaptively for each inter-mode CU. In an embodiment, without loss of generality, the a and b LIC model parameters may be generated as:

$$N = 2 \times \min(width_{PU}, height_{PU}), \qquad (6)$$

$$a = \frac{N \cdot \sum (L(n) \cdot C(n)) - \sum L(n) \cdot \sum C(n)}{N \cdot \sum (L(n) \cdot L(n)) - \sum L(n) \cdot \sum L(n)},$$

$$b = \frac{\sum C(n) - a \cdot \sum L(n)}{N},$$

where N denotes the number of samples used to compute the LIC parameters a and b, $width_{PU}$ and $height_{PU}$ denote the width and height of a prediction unit (PU) being used for LIC, C(n) are neighboring reconstructed samples of the current block and L(n) denotes neighboring reference (or inter-predicted) samples of the reference block. Ignoring reshaping for now, predicted samples are updated using the derived LIC parameters as follows:

$$Y_{pred}'(x,y) = a * Y_{pred}(x,y) + b \qquad (7)$$

where $Y_{pred}(x,y)$ denotes the output of inter-prediction unit (280), and as discussed earlier, given residuals $Y_{res}$, without reshaping, the output of reconstruction unit (285) can be expressed as $$Y_r = Y_{res} + Y_{pred}'. \qquad (8)$$

Figure 3A:
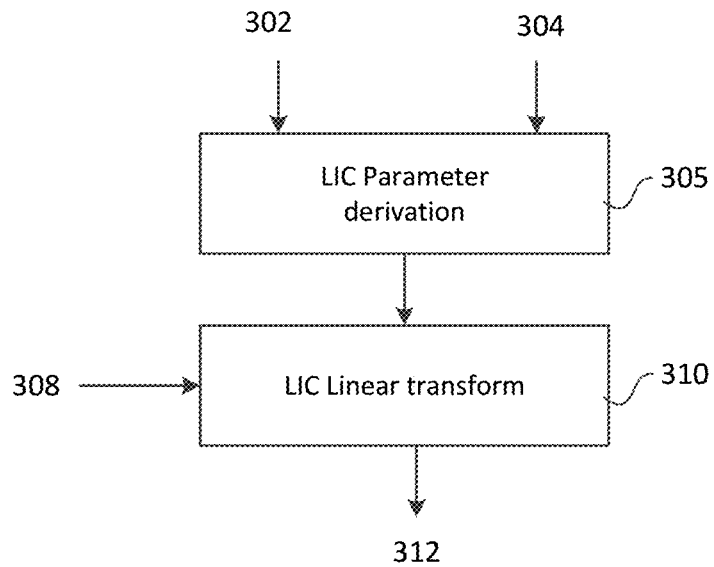
FIG. 3A depicts an example processing pipeline for local illumination compensation without any reshaping.

The process is summarized in FIG. 3A. Given C(n) (302) and L(n) (304) samples, the a and b parameters are derived in block 305 (e.g., according to equation (6)). Then, given $Y_{pred}$ data (308), block (310) applies the linear transformation of equation (7) to generate $Y_{pred}'$ data (312). Note that the embodiments described herein are applicable to any alternative method being used to compute the LIC parameters a and b. Furthermore, for all embodiments described herein, not all C(n) and L(n) samples are needed to compute the LIC parameters. For example, one may use fewer samples by using sub-sampling, averaging, filtering of samples, and the like.

Combining LIC with In-Loop Reshaping

If LIC is to be combined with reshaping, from FIG. 2A and FIG. 3A, the C(n) data is in the reshaped domain, while the L(n) and predicted data (308) data are in the original domain, which may generate incorrect a and b parameters for the LIC model.

Figure 3B:
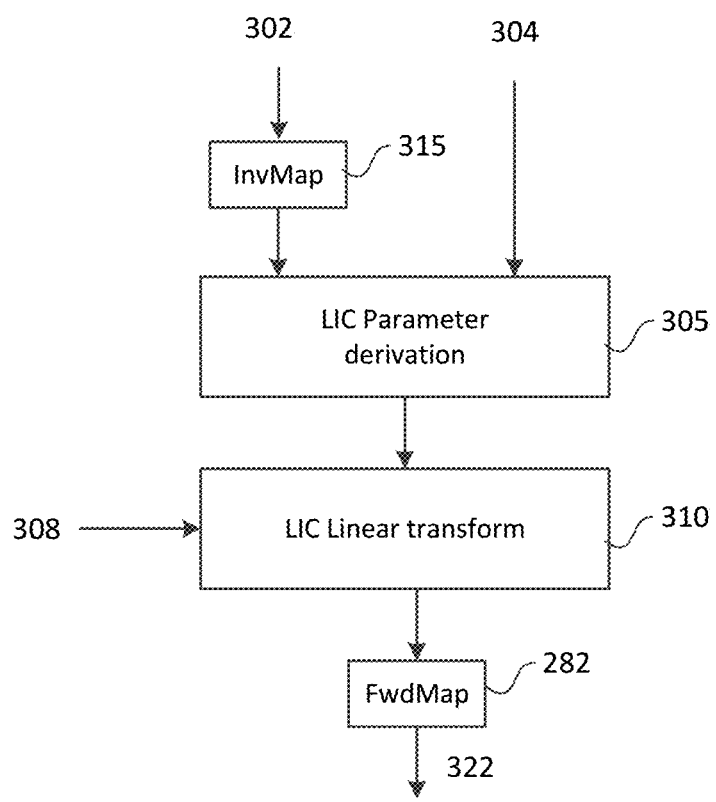
FIG. 3B, FIG. 3C, and FIG. 3D depict example processing pipelines for combining luma reshaping with local illumination compensation according to embodiments.

FIG. 3B depicts an example embodiment to generate LIC parameters in the original domain and generate an updated predicted value (322) in the reshaped domain. As depicted in FIG. 3B, the reconstructed data (302) are processed by the inverse mapping function (315) to compute, together with data 304, the LIC parameters in block 305. Following the LIC linear transform (310), the LIC-predicted data is mapped back to the reshaped domain using the forward mapping function (320), to generate predicted data (322) in the reshaped domain. Equation (6) can now be expressed as $$a = \frac{N \cdot \sum (L(n) \cdot InvLUT(C(n))) - \sum L(n) \cdot \sum InvLUT(C(n))}{N \cdot \sum (L(n) \cdot L(n)) - \sum L(n) \cdot \sum L(n)}, \qquad (9)$$

$$b = \frac{\sum InvLUT(C(n)) - a \cdot \sum L(n)}{N}.$$

Figure 3C:
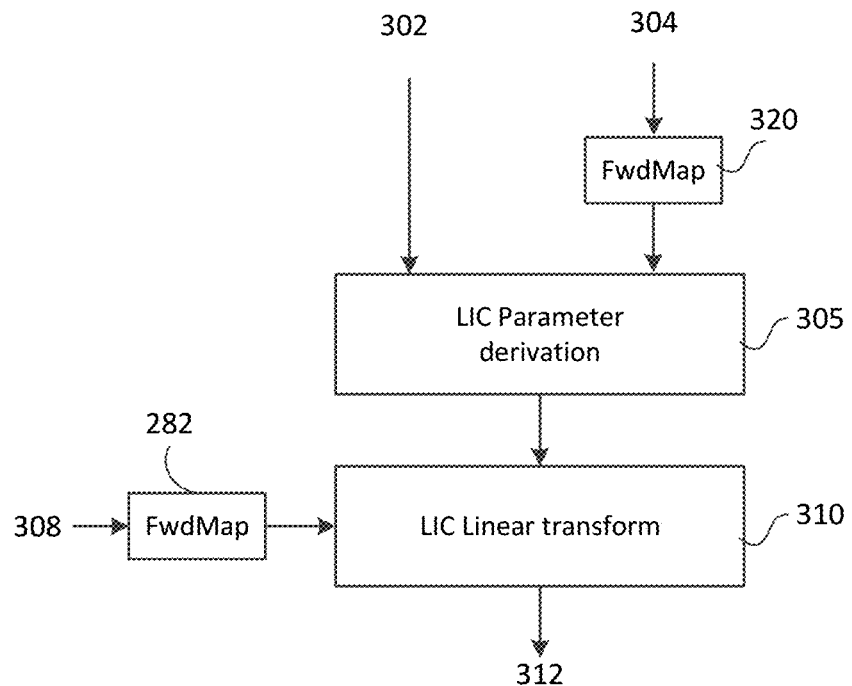

Because of the computational disadvantage to access the InvMap function versus accessing the FwdMap function, in an embodiment, as depicted in FIG. 3C, it is computationally more efficient to apply the FwdMap function (320) to both the reference data (304) and the predicted data (308). Note that FwdMap functions 320 and 282 are identical; however, they are numbered differently to better help explaining the processes when LIC is on versus when LIC is off. As depicted in FIG. 3C, all operations are now performed in the reshaped domain. Output 312 includes both LIC prediction and reshaping adjustments. Equation (6) can now be expressed as $$a = \frac{N \cdot \sum (FwdLUT(L(n)) \cdot C(n)) - \sum FwdLUT(L(n)) \cdot \sum C(n)}{N \cdot \sum (FwdLUT(L(n)) \cdot FwdLUT(L(n))) - \sum FwdLUT(L(n)) \cdot \sum FwdLUT(L(n))}, \qquad (10)$$

$$b = \frac{\sum C(n) - a \cdot \sum FwdLUT(L(n))}{N}.$$

When LIC is off or disabled, in FIG. 3C, steps 320 and 305 may be skipped and in step 310 one my simply apply α=1 and b=0; thus, during inter-prediction, the predicted output 312 will be properly reshaped, as depicted in FIG. 2A.

From a workflow perspective, without LIC, inter-prediction (280) is followed by forward mapping (282). With LIC enabled, according to FIG. 3C, one may consider that this workflow is changed: forward mapping is applied first to the inter-predicted data, followed by the LIC linear transform.

Figure 3D:
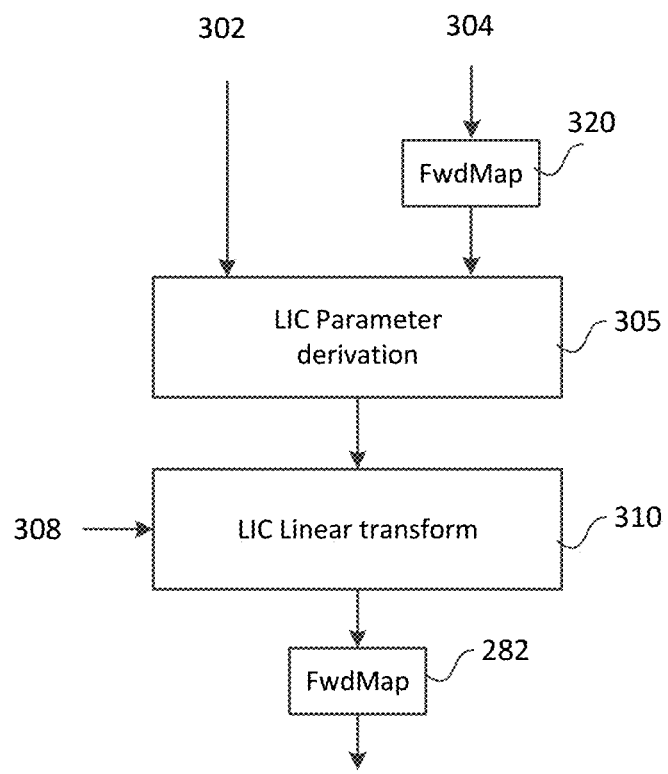

In another embodiment, for example, as depicted in FIG. 3D, the LIC parameters may be derived in the reshaped domain, but the actual LIC transform (310) may be performed in the original domain. In this approach, LIC mapping (310) precedes forward mapping (282), thus maintaining the same workflow for both when LIC is enabled or disabled; however, this approach assumes that the linear-model parameters a and b have similar values irrespective of which domain (original or reshaped) they are derived. An example embodiment of this approach is depicted in FIG. 3D, and equation (6) can now be expressed as $$a = \frac{N \cdot \sum (FwdLUT(L(n)) \cdot C(n)) - \sum FwdLUT(L(n)) \cdot \sum C(n)}{N \cdot \sum (FwdLUT(L(n)) \cdot FwdLUT(L(n))) - \sum FwdLUT(L(n)) \cdot \sum FwdLUT(L(n))}, \quad (11)$$

$$b = \frac{\sum C(n) - a \cdot \sum FwdLUT(L(n))}{N}.$$

This approach assumes that it should make no difference whether the linear-model parameters are computed in the same domain (reshaped or original) as the domain being used for the actual LIC prediction. In an embodiment, expecting that the error due to this assumption may be larger for b than for a, a is computed in the reshaped domain (as in equation (11), but b is computed in the original domain as in $$b = \frac{\left(N \cdot InvLUT\left(\frac{\sum C(n)}{N}\right) - a \cdot \sum L(n)\right)}{N}. \quad (12)$$

This approach, as in FIG. 3B, requires that C(n) data (302) are inversely mapped to the original domain before computing b.

The proposed embodiments are summarized in the Table 1 below.

TABLE 1

Trade-offs in integrating LIC with reshaping

| Model | LIC parameters derivation domain | LIC transform domain | Pipeline workflow |
|---|---|---|---|
| A - Eq. (9) | all in original | original | a) LIC, b) FwdMap |
| B - Eq (10) | all in reshaped | reshaped | a) FwdMap, b) LIC |
| C - Eq. (11) | all in reshaped | original | a) LIC, b) FwdMap |
| D - Eq. (12) | a in reshaped, b in original | original | a) LIC, b) FwdMap |

From a computational point of view, models B, C, and D, are less complex than model A. Models C and D address a potential pipeline workflow issue with model B, thus providing a more unified decoder pipeline, but at the potential cost of losing some coding efficiency.

REFERENCES

Each one of the references listed herein is incorporated by reference in its entirety.

[1] B. Bross, J. Chen, and S. Liu, "*Versatile Video Coding* (Draft 5)," JVET output document, JVET-N1001, v5, uploaded, May 14, 2019.
[2] PCT Application PCT/US2019/017891, Image Reshaping in Video Coding Using Rate Distortion Optimization, filed on Feb. 14, 2018, by P. Yin et al.
[3] "*Algorithm description for Versatile Video Coding and Test Model 4 (VTM 4),*" J. Chen et al., JVET Output document, JVET-M1002-v2, 13$^{th}$ Meeting, Marrakech, 9-18 Jan. 2019.
[4] "*Algorithm description for Joint Exploration Test Model 7 (JEM 7),*" J. Chen et al., JVET Output document, JVET-G1001-v1, 7$^{th}$ Meeting, Torino, IT, 13-21 Jul. 2017.

EXAMPLE COMPUTER SYSTEM IMPLEMENTATION

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to signal reshaping and coding of images, such as those described herein. The computer and/or IC may compute any of a variety of parameters or values that relate to the signal reshaping and coding processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to signal reshaping and coding of images as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient signal reshaping and coding of images are thus described. In the foregoing specification, embodiments of the present invention have been described with reference to numerous specific details that may vary from implementation to implementation. Thus, the sole and exclusive indicator of what is the invention and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus to combine in-loop reshaping with local illumination compensation (LIC), the apparatus comprising:
    an input to access video pictures comprising coded units; and
    a processor, wherein the processor:
        accesses first neighboring samples of a current coded unit (CU) in a reshaped domain;
        accesses neighboring samples of a reference block to the current CU in an original domain;
        generates second neighboring samples of the current CU in the original domain by applying an inverse mapping function to the first neighboring samples of the current CU;
        generates LIC parameters based on the second neighboring samples of the current CU and the neighboring samples of the reference block to the current CU;
        accesses first inter-predicted samples for the current CU in the original domain;
        generates second inter-predicted samples for the current CU based on the LIC parameters, a linear mapping using the LIC parameters, and the first inter-predicted samples for the current CU; and
        generates output inter-predicted samples for the current CU in the reshaped domain by applying a forward mapping function to the second inter-predicted samples for the current CU.

2. An apparatus to combine in-loop reshaping with local illumination compensation (LIC), the apparatus comprising:
    an input to access video pictures comprising coded units; and
    a processor, wherein the processor:
        accesses neighboring samples of a current coded unit (CU) in a reshaped domain;
        accesses first neighboring samples of a reference block to the current CU in an original domain;
        generates second neighboring samples of the reference block to the current CU in the reshaped domain by applying a forward mapping function to the second neighboring samples of the reference block to the current CU;
        generates LIC parameters based on the neighboring samples of the current CU and the second neighboring samples of the reference block to the current CU;
        accesses first inter-predicted samples for the current CU in the original domain;
        generates second inter-predicted samples for the current CU in the reshaped domain by applying the forward mapping function to the first inter-predicted samples for the current CU; and
        generates output inter-predicted samples for the current CU in the reshaped domain based on the LIC parameters, a linear mapping using the LIC parameters, and the second inter-predicted samples for the current CU.

3. An apparatus to combine in-loop reshaping with local illumination compensation (LIC), the apparatus comprising:
    an input to access video pictures comprising coded units; and
    a processor, wherein the processor:
        accessing first neighboring samples of a current coded unit (CU) in a reshaped domain;
        accessing first neighboring samples of a reference block to the current CU in an original domain;
        generates second neighboring samples of the reference block to the current CU in the reshaped domain by applying a forward mapping function to the second neighboring samples of the reference block to the current CU;
        generates LIC parameters based on the first neighboring samples of the current CU and the second neighboring samples of the reference block to the current CU;
        accesses first inter-predicted samples for the current CU in the original domain;
        generates second inter-predicted samples for the current CU in the original domain based on the LIC parameters, a linear mapping using the LIC parameters, and the first inter-predicted samples for the current CU; and
        generates output inter-predicted samples for the current CU in the reshaped domain by applying the forward mapping function to the second inter-predicted samples for the current CU.

4. The apparatus of claim 1, wherein the processor further combines the output inter-predicted samples for the current CU in the reshaped domain with received residual luma samples for the current CU in the reshaped domain to generate first reconstructed luma samples for the current CU in the reshaped domain.

5. The apparatus of claim 4, wherein the processor further:
    generates second reconstructed luma samples for the current CU in the original domain by applying an inverse reshaping function to the first reconstructed luma samples for the current CU; and generates decoded luma samples for the current CU based on the second reconstructed luma samples for the current CU.

6. The apparatus of claim 3, wherein the LIC parameters comprise two parameters and both parameters are derived based on the neighboring samples of the current CU and the second neighboring samples of the reference block to the current CU.

7. The apparatus of claim 3, wherein the LIC parameters comprise a first parameter and a second parameter, wherein the first parameter is derived based on the neighboring samples of the current CU and the second neighboring samples of the reference block to the current CU, and computing the second parameter comprises:

generating second neighboring samples of the current CU in the original domain by applying an inverse mapping function to the first neighboring samples of the current CU; and generating the second parameter based on the second neighboring samples of the current CU and the first neighboring samples of the reference block to the current CU.

* * * * *